July 13, 1937. R. S. CARUTHERS 2,086,601
MODULATING SYSTEM
Filed May 3, 1934 4 Sheets-Sheet 1

INVENTOR
R. S. CARUTHERS
BY G. H. Stevenson
ATTORNEY

July 13, 1937.  R. S. CARUTHERS  2,086,601
MODULATING SYSTEM
Filed May 3, 1934  4 Sheets-Sheet 2

INVENTOR
R. S. CARUTHERS
BY G. H. Stevenson
ATTORNEY

July 13, 1937.    R. S. CARUTHERS    2,086,601
MODULATING SYSTEM
Filed May 3, 1934    4 Sheets-Sheet 3

INVENTOR
R. S. CARUTHERS
BY
G H Stevenson
ATTORNEY

July 13, 1937.   R. S. CARUTHERS   2,086,601
MODULATING SYSTEM
Filed May 3, 1934   4 Sheets-Sheet 4
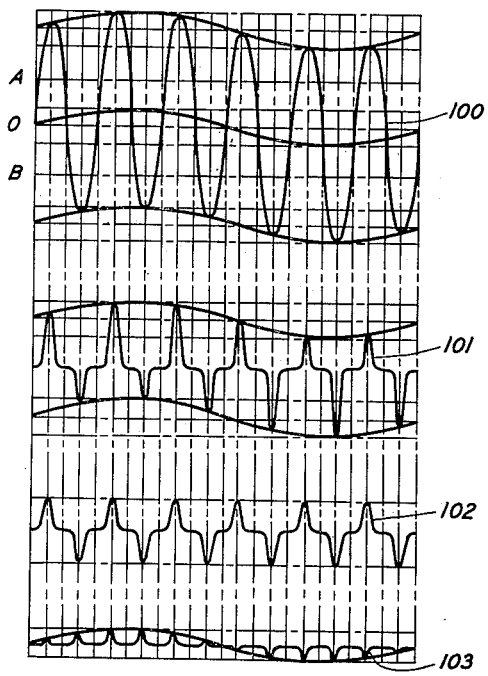
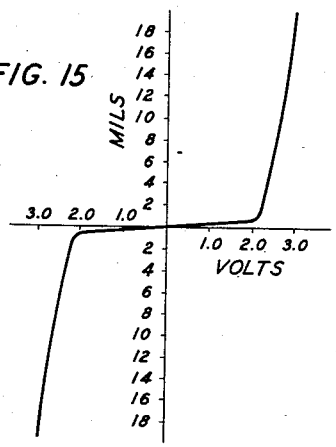
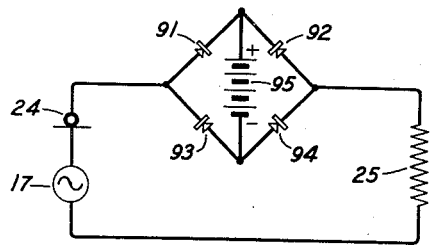
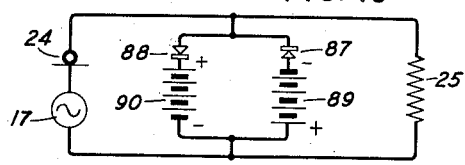
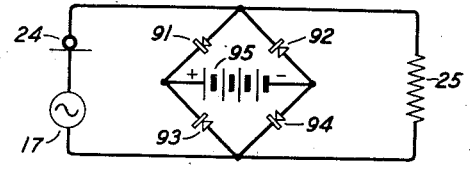
INVENTOR
R. S. CARUTHERS
BY
G. H. Stevenson
ATTORNEY Patented July 13, 1937

2,086,601

UNITED STATES PATENT OFFICE 2,086,601

MODULATING SYSTEM

Robert S. Caruthers, Mountain Lakes, N. J., assignor to Bell Telephone Laboratories, Incorporated, New York, N. Y., a corporation of New York Application May 3, 1934, Serial No. 723,691

20 Claims. (Cl. 179—171)

This invention relates to systems for effecting modulation, demodulation and detection of electrical waves and particularly to systems employing rectifiers of the dry surface contact type.

It has for its main object to increase the simplicity, economy and reliability of such systems.

Another object is to secure more complete suppression of unmodulated carrier in cases where this is desirable.

A further object is to minimize the waste of energy in the frequency transformations incident to modulation, demodulation and detection.

A still further object is to eliminate the necessity for balancing two or more transformer windings in order to effect suppression of unwanted modulation products, of carrier or of signal input currents in the output circuit.

The present specification includes subject matter relating to bridge arrangements of rectifiers disclosed in my copending application Serial No. 644,267, filed November 25, 1932.

Broadly considered, a system of the kind to which the invention relates comprises a source of signal currents, a load circuit and means by which the signal currents are utilized to generate and control a current of desired form in the load circuit. Such a system is sometimes called a frequency changer, due to the fact that the input and output have different frequencies. The problem of attaining a high efficiency of energy transfer resolves itself into one of providing suitable coupling of a variable nature between source and load. If this is done the frequency change may be effectively regulated and the amplitude of the output may be controlled in accordance with the signal variations, accompanied by the least possible waste of energy.

In accordance with the invention, improved coupling arrangements are provided which include two or more rectifiers of the dry surface contact type, with appropriate control means, inserted in circuit between the input and output branches of the system. The condition of conductivity or non-conductivity of the individual rectifiers is varied preferably in an abrupt manner, by the action of an associated source of carrier waves, supplemented in some cases by a biasing means. The resulting variation of coupling may be such that the signal source and the load are alternately coupled to and decoupled from each other, or the variation may cause phase reversals of the coupling, or any desired alteration. In many instances, it is to be preferred that the circuits be substantially decoupled during the greater part of the carrier cycle, the coupling taking effect during only a very small portion of the cycle. An impulsive excitation of the load is thus effected, the signal source acting upon the load through the coupling in an intermittent manner. During the intervening periods, interaction with its attendant energy dissipation is prevented.

A feature of the invention is the use of a carrier voltage considerably greater than the signal voltage so that the carrier substantially controls the rectifiers, causing them to act as voltage operated switches or commutators at periodic intervals determined by the carrier frequency. Another feature is the use of a biasing means of large voltage compared with the signal source, but somewhat less than the maximum carrier voltage. By adjustment of the voltages the excitation of the load circuit through the rectifiers may be confined to whatever fractional part of the carrier cycle may be found to accompany the highest efficiency under practical conditions. Other features relate to a full-wave rectifying arrangement of the dry surface contact type for use as a modulator, and combinations of rectifiers acting in regular rotation to produce an output wave of twice the carrier frequency, that is, for third order modulation. An incidental feature is a resistance-condenser combination in series with a carrier source to provide a biasing voltage for a rectifier.

Using a modulating system embodying certain features of the invention, with copper oxide rectifiers for modulating elements, I have been able to translate signal currents into output currents comprising a single side-band wave with a resulting transmission loss of less than two decibels whereas in systems of the prior art a loss of six decibels is the minimum practically attainable. The loss referred to is measured by the ratio of the side-band power available to the signal power expended, exclusive of filter losses.

The invention will be more fully understood from the following detailed description of representative circuits in which it is embodied and of their principles of operation. Of the accompanying drawings, Fig. 1 represents a bridge arrangement of rectifiers to act as a commutator in accordance with the invention;

Figure 10:
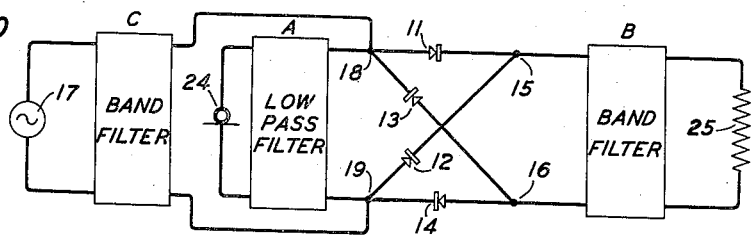
Fig. 10 shows a full-wave rectifier arranged to operate as a modulator.
Figure 10A:
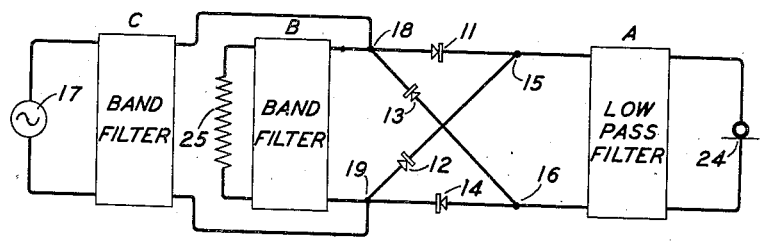
Figure 11:
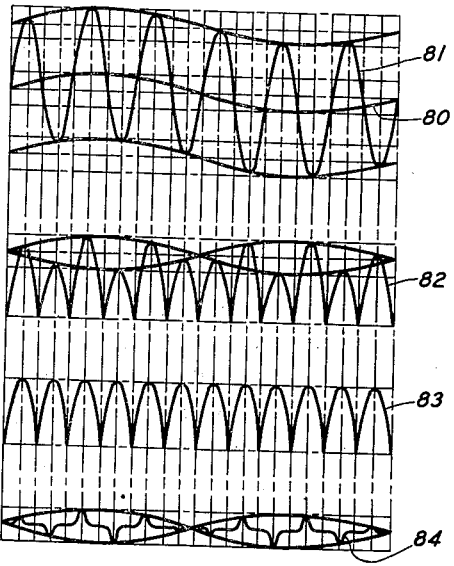
Figure 12:
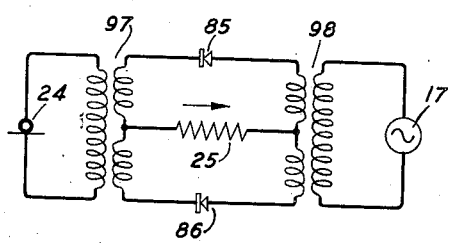
Figure 13:
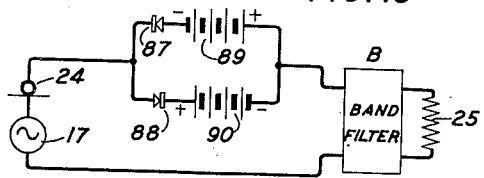

Fig. 10-A shows a modification of Fig. 10;

Fig. 11 consists of curves useful in the explanation of the system of Fig. 10;

Fig. 12 shows another form of full-wave rectifier for use in modulation;

Fig. 13 shows another arrangement of biased rectifiers for third order modulation;

Figs. 14 and 15 show curves employed in explaining the operation of the system of Fig. 13;

Figs. 16, 17 and 18 show other forms of third order modulators employing biased rectifiers.

Figure 1:
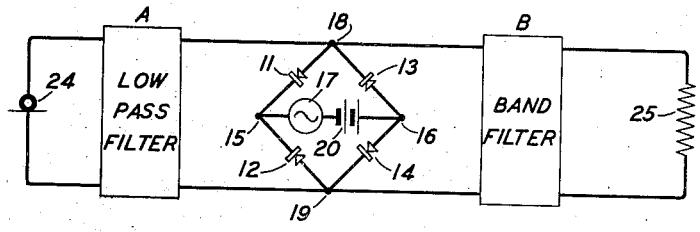

Fig. 1 shows a modulating system in which a Wheatstone bridge network containing rectifiers is connected in shunt relation to a signal source 24 and a load circuit 25. An input filter A adapted to pass the essential frequencies of the signal is interposed between source 24 and the bridge. Likewise, an output filter B is placed between the bridge and load 25 to select a desired output wave. The leads joining the filters connect also to points 18 and 19, respectively, at two diagonally opposite corners of the bridge. The left-hand side of the bridge comprises rectifiers 11 and 12 which have a common terminal 15 and are so poled that each is conductive toward the common terminal, as indicated by the direction of the arrowheads in the schematic representation. The right-hand side of the bridge comprises rectifiers 13 and 14 which have a common terminal 16 and are so poled that each is conductive away from the common terminal. A carrier generator 17 is connected between the terminals 15 and 16 in series with a polarizing or biasing battery 20. Due to the bridge arrangement of the circuits the pair of terminals 15, 16 and the pair 18, 19 are conjugately related, the carrier source and load circuit appearing in the respective conjugate branches.

In the operation of the system of Fig. 1, signals or modulating currents supplied by the source 24 tend to establish an alternating potential of signal frequency between the points 18 and 19. The carrier voltage from generator 17 is adjusted to a sufficiently large amplitude to dominate the signal voltage in the rectifiers so that the carrier voltage causes them to alternate synchronously between a condition of low resistance and one of very high resistance or substantial non-conductivity. During the period of low resistance the rectifiers form practically a short circuit between the points 18, 19, preventing the signal voltage from being impressed upon the output filter. During the high resistance period, the rectifiers no longer short-circuit the output, and being then of substantially no effect as a shunt, allow the signal voltage to be applied to the filter. Pulses of signal current are thus transmitted, constituting a modulated wave. As the carrier source is conjugate to the load the unmodulated carrier component is suppressed.

Figure 2:
Fig. 2 shows one form of wave to be expected in the system of Fig. 1.

The relative voltages of the biasing battery and the carrier source determine the length of the pulses. A small bias is suitable for producing half-wave pulses, i. e., pulses occupying half of each carrier cycle. The value and polarity of the bias in this case should be such as to insure that linear rectification shall begin when the applied voltage is nil. The modulated waves generated will then approximate the wave shape shown in Fig. 2, where a signal wave (sinusoidal) is interrupted abruptly during one-half of each carrier cycle. A large value of bias voltage on the other hand is suitable for producing short impulses. A positive, i. e., conductive bias is used in the shunt arrangement of Fig. 1. If the bias is made a very little less than the maximum carrier voltage the pulse length becomes a small fraction of the carrier cycle. I find that when the load is substantially a pure resistance, pulses of half-cycle length are most efficient, while when the load is fairly sharply tuned, the efficiency of operation is improved by shortening the transmitted pulses. In a given case the optimum pulse length is readily found by adjusting the bias.

Figure 3:
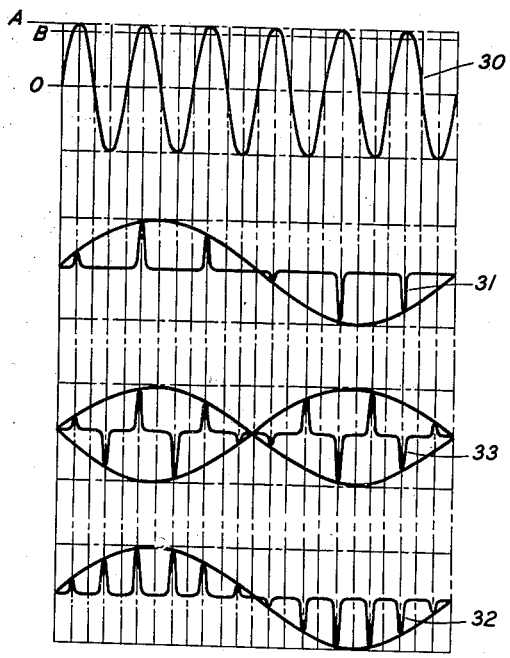
Fig. 3 is a diagram useful in explaining the operation of certain systems embodying the invention.

The formation of short impulses is illustrated by the curves 30 and 31 in Fig. 3. Curve 30 shows the sinusoidal carrier wave for reference, while curve 31 is the train of impulses transmitted to the load. In the system of Fig. 1 there is one impulse to a complete cycle of the carrier. The ordinate OA in Fig. 3 represents the maximum carrier amplitude; OB, the bias; and BA, the slight excess of carrier. The envelope of the pulses in curve 31 is the signal, shown for simplicity as a sine wave.

Figure 4:
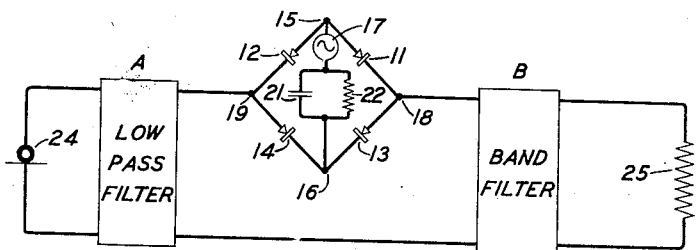
Fig. 4 shows a variation of the system of Fig. 1.

Fig. 4 shows a modification of the system of Fig. 1 in which the interruption of the signal currents is effected by the periodical opening and closing of a series connection. The general configuration of the bridge network is unchanged, the points 18, 19 however, being serially connected between the filters A and B. The biasing battery 20 is replaced by a resistance 22 shunted by a condenser 21 for maintaining a negative bias derived from rectified carrier currents. In the operation of the system of Fig. 4, the signal currents are interrupted when the bridge is in the high resistance condition and transmitted when it is in the low resistance condition.

While shortening of the pulse lengths may be practiced in either of the circuits shown in Figs. 1 and 4, it is best applied in the latter circuit where the bias is negative, that is, of such polarity as to normally block all the rectifiers. It will be evident that in the system of Fig. 1 where the desired decoupling between the input and output over the greater part of the carrier cycle makes necessary a large positive bias, there is a large current continually flowing within the bridge network. Where it is desired to save this drain on the biasing means the series arrangement will of course be found preferable.

Figure 5:
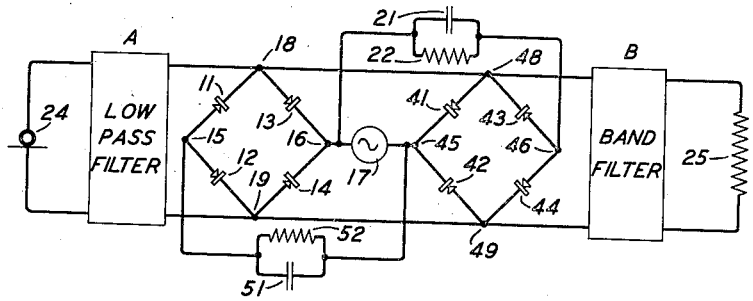
Figs. 5 and 6 show commutating arrangements for third order modulation.

Fig. 5 shows a modification suitable for third order modulation, in which two bridge networks are interposed between the input and output circuits and the networks are brought into action alternately under the control of the carrier generator. The first bridge is connected substantially as shown in Fig. 1. The second bridge is connected at points 48 and 49 with the terminals 18 and 19, respectively, of the first bridge network. The left-hand side of the second bridge comprises rectifiers 41 and 42 having a common terminal 45 and each poled in the conducting direction toward the common terminal. The right-hand side of the second bridge comprises rectifiers 43 and 44 with a common terminal 46 and so poled that their conducting directions are away from the common terminal. The carrier generator 17 is connected between terminals 16 and 45 of the respective bridge networks. A self-polarizing network comprising the condenser 21 in parallel with the resistance 22 is connected between bridge terminals 16 and 46. A similar network comprising a condenser 51 and a resistance 52 is connected between terminals 15 and 45.

Figure 7:
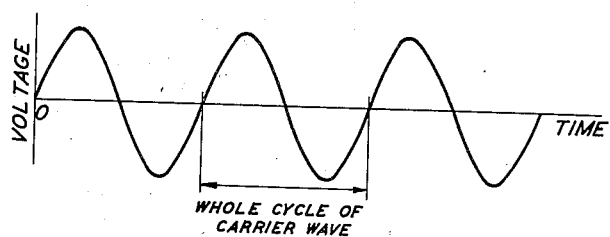
Figs. 7, 8 and 9 show curves useful in explaining the operation of the systems of Figs. 5 and 6.
Figure 8:
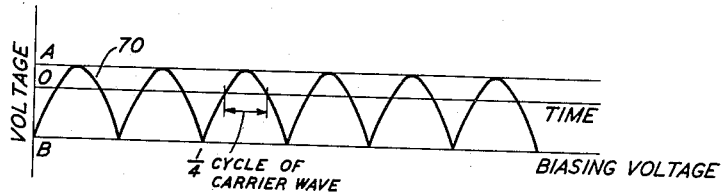
Figure 9:
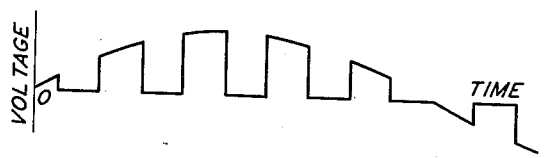

In the operation of the system of Fig. 5 carrier current from the generator 17 flows alternately through (1) a path comprising condenser 21 and resistance 22 in parallel and the group of rectifiers 41, 42, 43 and 44 and (2) a path comprising condenser 51 and resistance 52 together with the group of rectifiers 11, 12, 13 and 14. The rectified carrier current establishes polarizing potentials across the respective resistance-condenser combinations to maintain all the rectifiers normally in the non-conducting direction. When the load circuit is broadly tuned or substantially a pure resistance, the best adjustment is one permitting the carrier voltage to overcome the polarizing voltage during intervals a quarter cycle in duration. This relationship between the carrier voltage and the bias is illustrated in Figs. 7, 8 and 9. The cyclic variation of the voltage of the carrier generator is shown for reference in Fig. 7. Curve 70 of Fig. 8 represents the rectified carrier pulses, the amplitude of which is represented by the ordinate BA. The biasing voltage is equal to OB and for the condition of operation illustrated is about 70% of the voltage BA in order that the biasing voltage may be overcome during approximately a quarter cycle of the carrier wave. Fig. 9 represents a signal current interrupted periodically at the rate of the double carrier frequency with quarter cycle intervals of interruption and illustrates approximately the wave form of the voltage impressed upon the output filter when a sinusoidal signal current is supplied to the system of Fig. 5. When the load circuit is sharply tuned, the transmitted pulses may be shortened in accordance with the principles of operation above described by increasing the biasing voltage relative to the carrier voltage. The wave form of the resultant modulated wave is then shown more closely by curve 32 in Fig. 3.

Figure 6:
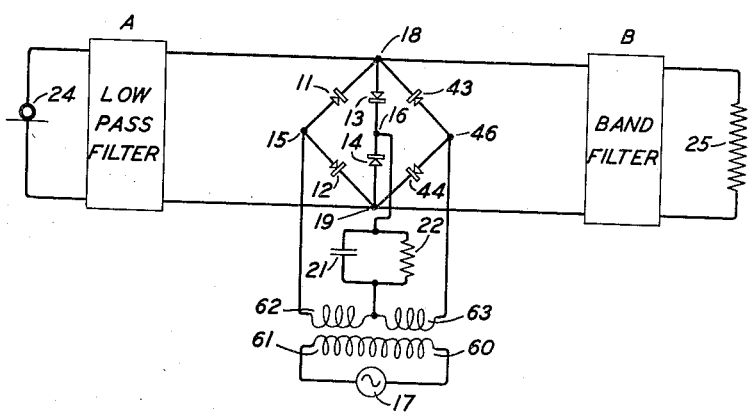

Fig. 6 shows a modified circuit in which the carrier generator is connected to the bridge network through a three-winding transformer. In this arrangement a single biasing means is sufficient and the number of rectifying elements necessary is reduced from eight to six. One bridge network is formed with rectifiers 11 and 12 having the common terminal 15 and rectifiers 13 and 14 with the common terminal 16. The second bridge, which is partly merged with the first, comprises rectifiers 13 and 14 with common terminal 16 and rectifiers 43 and 44 with common terminal 46. In fact, the two bridge networks shown in Fig. 5 are, in the system of Fig. 6, consolidated into the single network shown in which rectifiers 13 and 14 absorb the function of the rectifiers 41 and 42. The generator 17 is connected to the combined network through transformer 60 which has a primary winding 61 and two secondary windings 62 and 63, respectively. The common terminal of the secondary windings is connected through the self-polarizing network to the bridge terminal 16. The extremities of the secondary windings are connected respectively to the points 15 and 46.

In the operation of the system of Fig. 6, during one portion of the carrier cycle the generator 17 impresses a voltage by means of secondary winding 62 upon the bridge network in the conducting direction of rectifiers 11, 12, 13 and 14. During a quarter cycle or less this voltage is sufficient to overcome the biasing potential of network 21, 22 thereby putting the above mentioned rectifiers into the low resistance condition and short-circuiting the line between points 18 and 19. During a succeeding portion of the carrier cycle, the carrier voltage is in the conducting direction of the rectifiers 13, 14, 43 and 44. For an interval the biasing potential is overcome, putting the latter group of rectifiers into the low resistance condition and again short-circuiting the line. In a manner similar to that described in connection with the system of Fig. 5 a modulated wave like that shown in Fig. 9 or by curve 32 of Fig. 3 is impressed upon the output filter.

Fig. 10 shows a modulating system in which a full-wave rectifier is inserted between the sources of impressed waves and the load circuit. The rectifier is in the form of a bridge network of rectifying elements. With suitable adjustments of the amplitude of the carrier wave the bridge network may be controlled to effect periodical reversals of the signal current in synchronism with the carrier. In the drawings the bridge network is represented in the lattice form in order to illustrate more clearly the manner in which the reversals are effected. In this arrangement the individual rectifiers in the bridge arms are poled in the same manner as in Figs. 1 and 3 and the signal input circuit is connected between points 18 and 19. The carrier generator 17, however, is also connected between points 18 and 19, while the output circuit is connected across the terminals 15 and 16. A filter C adapted to pass the carrier frequency is connected between the carrier generator and the points 18 and 19.

The operation of the system of Fig. 10 may be explained by reference to the curves shown in Fig. 11. Curve 80 represents a sinusoidal signal wave upon which is superposed a carrier wave having an amplitude several times larger. The resultant wave 81 represents the voltage impressed upon the bridge network in Fig. 10. The effect of passing the wave 81 through a full-wave rectifier is shown by the curve 82, which is readily analyzed into its approximate components, a rectified carrier wave 83 containing only even harmonics of the carrier, and a modulated wave 84 which consists of alternately directed pulses which occur at the rate of two in each cycle of the carrier wave. Curve 84 is evidently a modulated wave of a common sort, namely, a second order wave having the fundamental carrier suppressed. The carrier harmonics being usually of considerably higher frequency are readily separated from the modulated wave in the output filter with the result that only the modulated wave is transmitted to the load.

Considered from a slightly different viewpoint, the bridge in Fig. 10 is equivalent to a reversing switch or commutator, which equivalence is emphasized in the drawing by showing the bridge in lattice form. The reversing action is brought under the control of the carrier by making the carrier voltage great in comparison with the signal voltage. Evidently, it is then possible to interchange the signal input and the load circuit without disturbing the commutating or reversing action of the bridge as far as it affects the modulation of the signal wave. Fig. 10—A shows this modification. The main difference in operation is in the transmission of the carrier to various parts of the system. Whereas in the system of Fig. 10 the carrier is suppressed in the load but transmitted to the signal input circuit, in the modified arrangement the carrier is transmitted to the load but suppressed in the signal input circuit. The system of Fig. 10—A has the further property of suppressing not only the impressed signal wave but all harmonics thereof in the load circuit.

Fig. 12 shows a modified system with a mode of operation similar to that of the system of Fig. 10. By introducing two transformers with balanced windings the number of rectifying elements is reducible to two, while still providing full-wave rectification. In the figure the signal source 24 and carrier source 17 are connected to rectifiers 85 and 86 through transformers 87 and 88, respectively. For simplicity all filters are omitted but may be employed, of course, wherever desirable. The load 25 is connected between the midpoints of the divided secondary windings of the two transformers.

In the operation of the system of Fig. 12 one-half of the impressed wave is transmitted to the load through rectifier 85 and the other half through rectifier 86. Both rectifiers are poled in such a direction that the resulting currents in the load pass from left to right as shown in the diagram. The wave forms resulting from the rectification are the same as illustrated in Fig. 11.

Fig. 13 shows another combination of biased rectifiers for third order modulation. In this circuit the second harmonic of the impressed carrier wave is suppressed while the fundamental carrier is either transmitted to the load or removed by means of filter B. In the specific arrangement shown the signal source 24 and carrier source 17 are connected to a pair of rectifiers 87 and 88 with polarizing batteries 89 and 90, respectively. The rectifiers are connected serially with a filter which is connected in turn to the load 25. The rectifiers are oppositely directed so as to provide a path for currents in either direction between the sources and the load. The biasing batteries are arranged so that both rectifiers are normally non-conductive.

In the operation of the system of Fig. 13 when the impressed voltages from the sources are sufficient to overcome one or the other of the biasing voltages an impulse is transmitted through the associated rectifier to the load. As two paths of opposite conductivity are provided, the impulses transmitted may go either way and may alternate in direction. The action of the circuit is more readily understood by reference to the curves in Fig. 14 of which curve 100 represents the impressed wave made up of carrier and signal superposed. The ordinates OA and OB represent the biasing voltages. Curve 101 shows schematically the wave tips which exceed the biasing voltages and are transmitted through the rectifiers. The transmitted curve is readily analyzed by inspection into the components 102 and 103. The part shown in curve 102 is a train of impulses having the fundamental carrier frequency, the other component consisting of impulses at twice the carrier rate controlled in accordance with the form of the signal wave. It will be evident from further inspection that the curve 103 has the distinguishing characteristics of a third order modulated wave, particularly one in which the second harmonic of the carrier frequency is suppressed. As the modulated wave alone is usually desired, the fundamental carrier may be suppressed in the output filter.

High efficiency in the system of Fig. 13 is promoted by employing biasing voltages that are large compared with the signal voltage and making the maximum carrier voltage somewhat greater than the bias. A pair of biased rectifiers has a combined current-voltage characteristic of the general form illustrated in Fig. 15. The curve shows that when the impressed voltage is less than the bias the current is very small. The absolute value of the current in this region is determined by the amount of reverse current which is passed by the particular rectifiers employed. The more perfectly unidirectional the rectifier, the smaller the reverse current. At voltages in excess of the bias, however, the current increases very rapidly with further increase in voltage.

The curve of Fig. 15 may be approximately represented by the formula $$I = AE^n \quad (1)$$

in which I is the current, E is the voltage, A is a factor of proportionality and $n$ represents an odd integer. The larger the value of $n$ the more sharply the curve bends and the more efficient is the device as a modulator. The increase in efficiency with increased value of $n$ may be illustrated mathematically in the following manner: Assuming that $C \cos c$ is the carrier voltage impressed upon the modulating element and $V \cos v$ is the signal voltage, then the total impressed voltage is $$E = C \cos c + V \cos v \quad (2)$$

Substituting this value of E in Equation (1) gives the current $$I = A(C \cos c + V \cos v)^n \quad (3)$$

To investigate the value of the efficiency for a particular value of $n$ the desired value may be substituted in Equation (3). For example, when $n = 3$ the current is $$I = A(C \cos c + V \cos v)^3 \quad (4)$$

Expanding the right-hand side of Equation (4) by means of known trigonometrical transformations it is a simple matter to collect the terms of interest, namely, those of signal frequency and those corresponding to one of the third order side-bands. The result is as follows:

$$I = \left(\frac{3}{2}C^2V + \frac{3}{4}V^3\right)A \cos v + \frac{3}{4}C^2VA \cos(2c+v) + B \quad (5)$$

where B represents all the terms that are not of interest. The value of the efficiency is found by taking the ratio of the signal current to the side-band current which is as follows:

$$\frac{\frac{3}{2}C^2V + \frac{3}{4}V^3}{\frac{3}{4}C^2V} = 2 + \left(\frac{V}{C}\right)^2 \quad (6)$$

Highest efficiency is indicated by a low value of the ratio and hence $$\frac{V}{C}$$

in Equation (6) should be made always as small as possible. This requires that the carrier voltage be made several times as large as the signal voltage. If the carrier voltage is increased very greatly it is evident that the efficiency ratio approaches the value 2, the signal current being then twice the amplitude of the side-band current. The side-band current is six decibels below the signal current. Higher assumed values of $n$ substituted in Equation (3) give the following values of current ratio:

| $n$ | Current ratio |
|---|---|
| 5 | 1.5 |
| 7 | 1.33 |
| 9 | 1.25 |
| 11 | 1.2 |

In general the value of the current ratio is found to equal $$\frac{n+1}{n-1}$$

which has the limiting value of one as $n$ is made very large. Calculations of this sort indicate that the modulating efficiency may be considerably increased by any means which will increase the value of $n$, or which is the same thing, will increase the sharpness of the bend of the characteristic curve.

The system of Fig. 16 is similar to that of Fig. 13 but with the rectifiers connected in parallel with the load circuit rather than in series therewith. Again for simplicity all filters are omitted, but it is to be understood that they may be used wherever required. The rectifiers in Fig. 16 operate as a variable shunt impedance means which diverts current from the load circuit whenever the impressed wave reaches a voltage in excess of the biasing voltage in one or the other of the shunt paths, with the result that a third order modulated wave is transmitted to the load.

Fig. 17 is an arrangement similar to the arrangement in Fig. 13. Four rectifiers 91, 92, 93 and 94 are employed in a bridge arrangement. The load and the sources are connected serially in one diagonal of the bridge, the biasing battery 95 being connected in the other diagonal branch. The operation of the system is similar to that of the system in Fig. 13. An advantage of the bridge arrangement is that the battery is isolated by being placed in one conjugate branch of the bridge network.

Fig. 18 shows the bridge arrangement of rectifiers connected in parallel relation to the load and the operation is similar to the operation of the system of Fig. 17.

Any of the systems herein described will function equally well as a demodulator and may be so used simply by supplying a side-band current to the present output end of the output filter and connecting the present input end of the input filter to a receiver. In each system shown including those in which filters are not illustrated the change is made by substituting a source of side-band current for the load circuit and putting a receiver in place of the transmitter as illustrated. When the system is operating as a demodulator the incoming side-band wave is commutated or interrupted either at the carrier frequency rate or at a frequency related to the carrier, whereby there is produced an output wave which contains the desired signals as a component.

What is claimed is:

1. A modulating system comprising a rectifier bridge, a carrier source and a load circuit, said source and circuit being connected to the bridge in conjugate relation to each other, biasing means affecting all the bridge rectifiers in like polarity, and said rectifiers being so poled that the carrier wave from said carrier source affects all in like phase, and a signal source connected both to the bridge and to the load, said carrier source and biasing means being so proportioned that the peak voltage of the carrier wave as developed across each rectifier is greater than the voltage impressed upon said rectifier by the biasing means, whereby signal waves are transmitted to the load circuit with one interruption per carrier cycle.

2. A modulating system comprising a rectifier bridge, a carrier source and a load circuit, said source and circuit being connected to the bridge in conjugate relation to each other, biasing means affecting all the bridge rectifiers in like polarity, and said rectifiers being so poled that the carrier wave from said carrier source affects all in like phase, and a signal source connected both to the bridge and to the load, said carrier source and biasing means being so proportioned that the peak voltage of the carrier wave as developed across each rectifier is greater than the voltage impressed upon said rectifier by the biasing means, and said carrier and signal sources being so proportioned that the peak voltage of the carrier wave as developed across each rectifier is several times as great as the peak voltage of the signal wave developed across the rectifier, whereby signal waves are transmitted to the load circuit with one interruption per carrier cycle.

3. A modulating system comprising a signal source, a load circuit, a coupling network interposed between said source and load, said network consisting of four rectifiers arranged in the form of a Wheatstone bridge, and means for varying in a cyclical manner the degree of coupling provided by said coupling network, said means comprising a source of biasing voltage whereby the signal source and the load circuit are normally decoupled from each other, and said means further comprising a source of carrier waves the maximum voltage of which is slightly greater than the voltage of said biasing source, whereby the signal source and the load circuit are closely coupled during relatively brief periods while the carrier voltage exceeds the voltage of the biasing source.

4. A modulating system comprising a signal source, a load circuit, four rectifiers for coupling said signal source to said load circuit, said rectifiers being arranged in the form of a Wheatstone bridge, biasing means connected to the rectifiers to effect an initial state of decoupling between the signal source and the load circuit, and a carrier source having a maximum voltage slightly greater than the voltage of the biasing means, said carrier source being connected to the rectifiers to effect a close coupling between the signal source and the load circuit during relatively brief periods while the carrier voltage exceeds the voltage of the biasing means, whereby the signal source is intermittently coupled to the load circuit with an interruption in each cycle of the carrier wave.

5. A modulating system comprising a bridge network of rectifiers each adapted to function substantially as a voltage-operated switch, a carrier source and a load circuit connected to the bridge network in conjugate relation to one another, a source of biasing voltage for determining the initial state of all the rectifiers alike as conducting or non-conducting and a source of signaling voltage coupled to the load circuit by means of the bridge network, said rectifiers being so poled that the carrier affects all in like phase, and the peak voltage effective in the bridge network from said carrier source being greater than the biasing voltage effective therein, whereby transmission of signal variations to the load circuit is rendered intermittent at the carrier frequency rate.

6. A modulating system comprising a signal source, a load circuit, a bridge network of rectifiers, said signal source and load circuit being serially connected in one diagonal of the bridge network, means adapted to produce a biasing voltage large compared with the voltage of the signal source, and a carrier source connected together with said biasing means in the other diagonal of the bridge network, said rectifiers and said biasing means being so disposed that the biasing means renders all the rectifiers normally non-conducting, and said carrier source having a maximum voltage slightly greater than the biasing voltage, whereby the signal source and load circuit are substantially disconnected from one another except when the carrier voltage is in opposition to and greater than the biasing voltage.

7. A modulating system comprising a signal source, a load circuit, a bridge network of rectifiers, said signal source and load circuit being connected together in parallel in one diagonal of the bridge network, a biasing battery of large voltage compared with the signal source, and a carrier source connected together with the battery in the other diagonal of the bridge network, said rectifiers and said battery being so disposed that the battery renders all the rectifiers normally conductive, and said carrier source having a maximum voltage slightly greater than the battery voltage, whereby the bridge network substantially short-circuits the signal source and load circuit except when the carrier voltage is in opposition to and greater than the battery voltage.

8. A modulating system of the carrier suppression type comprising a source of signal waves, a load circuit, two bridge networks of rectifying devices interposed between said signal source and said load circuit, and a source of carrier waves connected to both bridges in conjugate relation to the load circuit for the suppression of the carrier in said load circuit, and means for biasing the rectifying devices normally to form a high resistance shunt across the load circuit, said source of carrier waves having a peak voltage greater than the voltage of said biasing means, and said carrier source being connected in opposite phase relation to the two bridge networks whereby the bridges alternately apply a low resistance shunt across the load circuit in succeeding half cycles of the carrier waves.

9. A modulating system according to claim 8, in which the ratio of the voltage of the biasing means to the voltage of the carrier source is adjusted to maintain a low resistance condition of each bridge network during substantially one-quarter of each cycle of the carrier wave.

10. A modulating system comprising a source of signal waves, a load circuit, two bridge networks of rectifying devices, said networks being connected in shunt with said signal source and said load circuit, biasing means for maintaining both of said bridge networks normally in a state of high resistance, and a source of carrier waves having a peak voltage somewhat larger than the voltage of said biasing means, said carrier source being connected to said bridge networks in opposite phase whereby the networks are alternately rendered of low resistance in successive half cycles of the carrier waves thereby interrupting the transmission of signal waves to the load circuit at twice the carrier frequency.

11. A modulating system of the carrier suppression type comprising a source of signal waves, a load circuit, two bridge networks of rectifying devices, said networks being connected in shunt with said signal source and said load circuit, biasing means for maintaining both of said bridge networks normally in a state of high resistance, and a source of carrier current connected to both bridges in conjugate relation to the load circuit for the suppression of the carrier in said load circuit, said carrier source having a peak voltage in excess of the voltage of said biasing means, and said carrier source being connected in opposite phase to the two bridge networks, whereby a low resistance shunt is periodically formed across the load circuit by the two bridge networks alternately to interrupt the signal waves at twice the carrier frequency.

12. A modulating system of the carrier suppression type comprising a source of signal waves, an input circuit selective to the signal waves, an output circuit selective to a desired modulated wave, a bridge network of similar rectifying devices in series with said input and output circuits, means for biasing each of said rectifying devices to render it normally non-conductive and a source of carrier waves connected to the bridge in conjugate relation to said output circuit to effect suppression of the carrier wave in said output circuit, whereby said bridge network substantially disconnects said output circuit from said input circuit once during each cycle of the carrier wave, and said signal waves are interrupted in such manner as to form a modulated wave in said output circuit.

13. A modulating system of the suppressed carrier type comprising a plurality of rectifiers arranged in the form of a Wheatstone bridge, each of said rectifiers being adapted to operate substantially as a switch having a low resistance when subjected to a voltage in the conducting direction of the rectifier and a high resistance when subjected to a voltage in the reverse direction, a load circuit and a source of carrier waves connected to the bridge in conjugate relation to one another to effect carrier suppression in the load circuit, a biasing means connected to said rectifiers for impressing thereupon respective control voltages, said biasing means and said carrier source being so proportioned that the peak voltage of the carrier wave as developed across each rectifier exceeds the voltage impressed upon said rectifier by the biasing means, and a source of signal currents connected to the bridge, whereby signal waves are transmitted to the load circuit with one interruption per carrier cycle.

14. A modulating system of the suppressed carrier type comprising four rectifiers each of which is adapted to operate substantially as a switch having a low resistance when subjected to a voltage in the conducting direction of the rectifier and a high resistance when subjected to a voltage in the reverse direction, said rectifiers being serially connected in a closed loop in the manner of a Wheatstone bridge and being so poled that each rectifier is flanked by two adjacent rectifiers the conductive directions of which are opposed to one another around the loop, a source of signal waves and a load circuit parallel connected in that diagonal of the bridge determined by the two corners each lying between adjacent rectifiers whose conductive directions around the loop are the same, a source of carrier waves connected in the remaining diagonal, and biasing means whereby control voltages are impressed upon the respective rectifiers, said biasing means and said carrier source being so proportioned that the peak voltage of the carrier wave as developed across each rectifier exceeds the voltage impressed upon said rectifier by the biasing means whereby said carrier waves cause the bridge network to form a low resistance shunt across said load circuit once during each cycle of said carrier waves.

15. A modulating system of the suppressed carrier type comprising four rectifiers each of which is adapted to operate substantially as a switch having a low resistance when subjected to a voltage in the conducting direction of the rectifier and a high resistance when subjected to a voltage in the reverse direction, said rectifiers being serially connected in a closed loop in the manner of a Wheatstone bridge and being so poled that each rectifier is flanked by two adjacent rectifiers the conductive directions of which are opposed to one another around the loop, a source of signal waves and a load circuit serially connected in that diagonal of the bridge determined by the two corners each lying between adjacent rectifiers whose conductive directions around the loop are the same, means for biasing each of said rectifiers to render it normally non-conductive and a source of carrier waves connected in the remaining diagonal, said source of carrier waves being of sufficient voltage to control the switching action of said rectifiers continuously and substantially to the exclusion of control by the signaling and biasing voltages, whereby said carrier waves cause the bridge network to set up a high resistance in series with said load circuit once during each cycle of said carrier waves.

16. A modulating system of the carrier suppression type comprising a source of signal waves, an input circuit selective to the essential frequencies of the signal waves, an output circuit selective to the essential frequencies of a desired modulated wave, two bridge networks of similar rectifying devices interposed between said input and output circuits, a source of carrier waves connected to both bridges in conjugate relation to said output circuit for the suppression of the carrier in said output circuit, and means for biasing the rectifying devices normally to form a high resistance shunt across the output circuit, said source of carrier waves having a peak voltage greater than the voltage of said biasing means, and said carrier source being connected in opposite phase relation to the two bridge networks, whereby said signal waves are interrupted at twice the frequency of the carrier wave.

17. A modulating system in accordance with the preceding claim, in which the voltages of the biasing means and of the carrier source are adjusted to confine the low resistance condition of each bridge network to one-quarter of a cycle of the carrier wave.

18. A modulating system comprising a signal source, a load circuit, a variable coupling network interposed between the signal source and the load circuit, said network including four rectifiers serially connected in a closed loop in the manner of a Wheatstone bridge and being poled so that each rectifier is flanked by two adjacent rectifiers the conductive directions of which are opposed to one another around the loop, said source of signal waves and said load circuit being connected in the diagonal of the bridge determined by the two corners each lying between adjacent rectifiers whose conductive directions around the loop are the same and a source of carrier waves and a biasing battery connected in the other diagonal, the maximum carrier voltage being slightly greater than the battery voltage whereby the signal source and the load circuit are coupled only at such times as the carrier voltage exceeds the battery voltage.

19. A modulating system comprising a signal source, a load circuit, a variable coupling network interposed between the signal source and the load circuit and including four rectifiers serially connected in a closed loop in the manner of a Wheatstone bridge and so poled that each rectifier is flanked by two adjacent rectifiers, the conductive directions of which are opposed to one another around the loop, said signal source and said load circuit being connected in parallel with each other in the diagonal of the bridge determined by the two corners each lying between adjacent rectifiers whose conductive directions around the loop are the same, and a source of carrier waves and a biasing battery connected in the other diagonal, said battery being poled to send current through all the rectifiers in the conductive direction, and the maximum carrier voltage being slightly greater than the battery voltage whereby the signal source and the load circuit are short-circuited by the coupling network except during relatively short intervals when the carrier voltage exceeds the battery voltage at which times the bridge is open-circuited and the signal source is directly connected to the load circuit.

20. A modulating system comprising a signal source, a load circuit, a variable coupling network including four rectifiers connected in a closed loop in the manner of a Wheatstone bridge and so poled that each rectifier is flanked by two adjacent rectifiers, the conductive directions of which are opposed to one another around the loop, said source of signal waves and said load circuit being serially connected in the diagonal of the bridge determined by the two corners each lying between adjacent rectifiers whose conductive directions around the loop are the same, and a source of carrier waves and a biasing means connected in the other diagonal, said biasing means being adapted to render all the rectifiers normally non-conducting and the maximum carrier voltage being slightly greater than the biasing voltage whereby said signal source and said load circuit are substantially disconnected from each other except when the carrier voltage is in opposition to and greater than the biasing voltage.

ROBERT S. CARUTHERS.